G. H. OWENS.
Hoes.
No 77,083. Patented April 21, 1868.
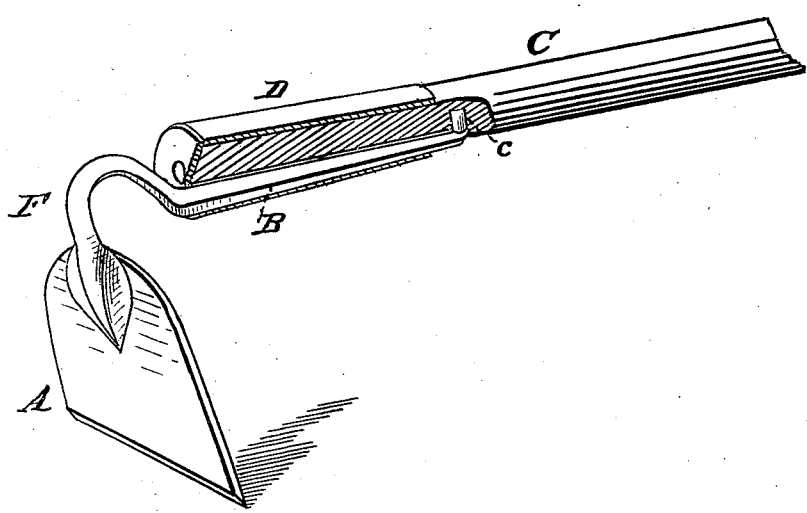
Witnesses:
A. C. Ashketter
J. A. Fraser
Inventor:
G. H. Owens
Munn & Co
attorneys.

United States Patent Office.

G. H. OWENS, OF MAYSVILLE, KENTUCKY.

Letters Patent No. 77,083, dated April 21, 1868.

IMPROVEMENT IN HOES.

*The Schedule referred to in these Letters Patent and making part of the same.*

TO ALL WHOM IT MAY CONCERN:

Be it known that I, G. H. OWENS, of Maysville, in the county of Mason, and State of Kentucky, have invented a new and useful Improvement in Hoes; and I do hereby declare that the following is a full, clear, and exact description thereof, which will enable those skilled in the art to make and use the same, reference being had to the accompanying drawings, forming part of this specification.

This invention relates to a new and improved method of fastening a hoe to the handle, whereby it is made much more useful and durable than hoes made in the ordinary manner.

And the invention consists in securing the hoe to the handle by a tapering ferrule, in the manner hereinafter described.

Figure 1 is a perspective view of the hoe, with the handle shown partly in section, and the ferrule broken away to show the manner in which the shank of the hoe is secured.

Figure 2 is a cross-section at $x\ x$, showing the end of the shank with the stud on its end turned at right angles.

Similar letters of reference indicate corresponding parts.

A is the blade of the hoe, B is the shank, C is the handle, and D is the ferrule.

A recess or channel is formed in the handle, into which the shank is placed, with the stud or teat $e$ in a corresponding hole in the channel, as represented in the drawing.

The handle is tapering from the neck F upward.

The shank projects slightly from the handle, so that when the ferrule is driven down, the hoe is firmly fixed to the handle.

By this arrangement a broken hoe is readily replaced with a new one, and hoes of different-shaped blades, adapted to different kinds of cultivation, may be used on the same handle.

Having thus described my invention, I claim as new, and desire to secure by Letters Patent—

The ferrule D, the shank B with the teat $e$, and the handle C, constructed, arranged, and combined substantially as and for the purposes described.

G. H. OWENS.

Witnesses:
    SAM. McDONALD,
    WM. P. COONS.